No. 749,421. PATENTED JAN. 12, 1904.
A. D. CAMPBELL.
COUPLING FOR AWNING FRAMES.
APPLICATION FILED NOV. 23, 1903.
NO MODEL.
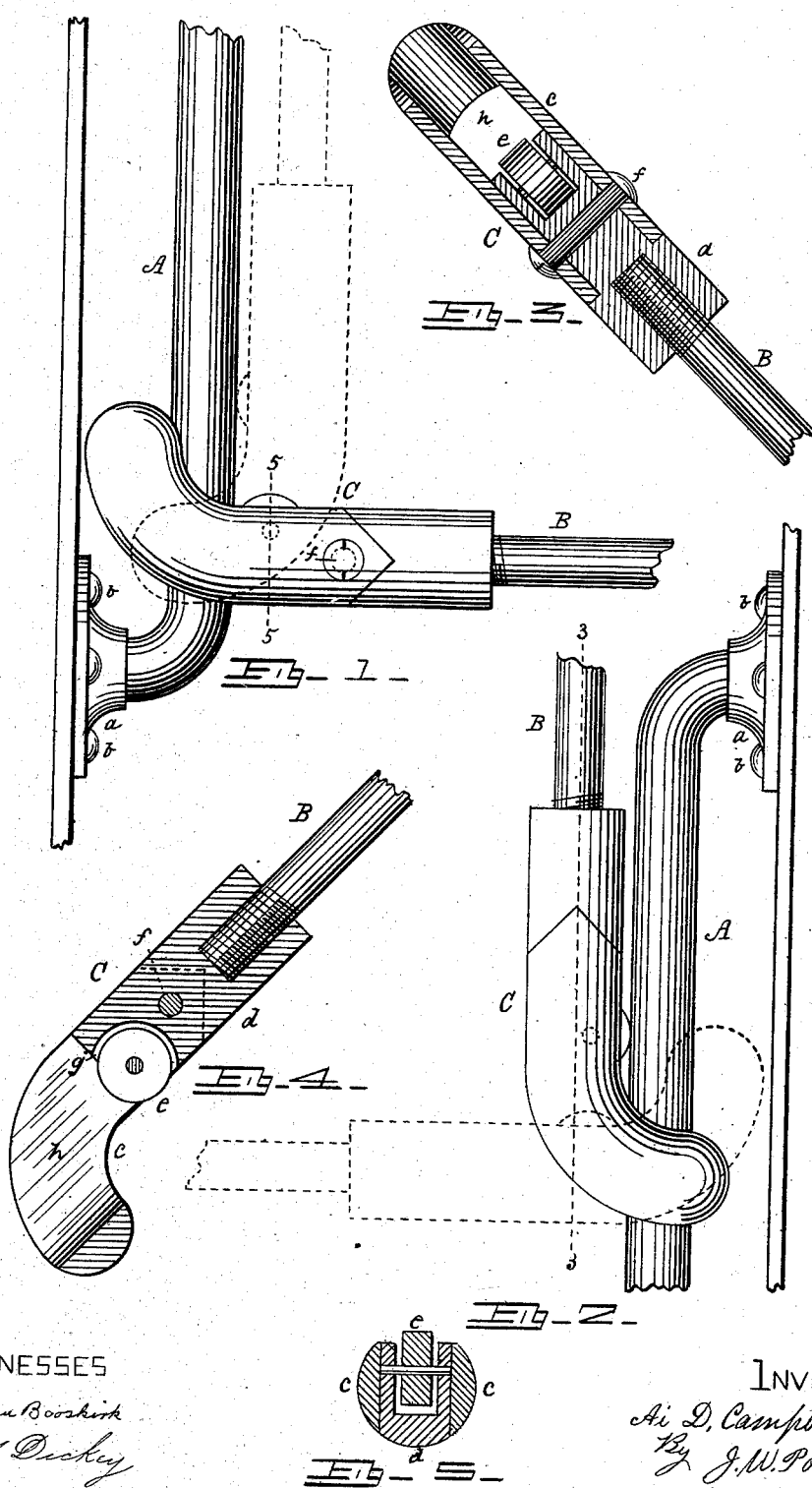
WITNESSES
INVENTOR
Ai D. Campbell
By J. W. Powers
Atty No. 749,421.                                    Patented January 12, 1904.

UNITED STATES PATENT OFFICE.

AI D. CAMPBELL, OF MINNEAPOLIS, MINNESOTA.

COUPLING FOR AWNING-FRAMES.

SPECIFICATION forming part of Letters Patent No. 749,421, dated January 12, 1904.

Application filed November 23, 1903. Serial No. 182,404. (No model.)

*To all whom it may concern:*

Be it known that I, AI D. CAMPBELL, of Minneapolis, county of Hennepin, and State of Minnesota, have invented a new and useful Improvement in Awning-Frames, of which the following is a full, clear, and exact description, reference being had to the accompanying drawings, which form a part of this specification.

This invention has for its object, first, the production of couplings for awning-frames through the use of which the movable members of the said frame (the portions to which the covering is affixed) may be attached to or removed from the stationary members thereof (the portions affixed to the building) without disturbing the latter; second, the production of couplings for awning-frames, through the use of which the said movable members may be raised to a vertical position or lowered to a horizontal position without the liability of displacement and without binding or cramping, and, third, to provide couplings for awning-frames wherein friction-rollers permit the movable members to slide upward and downward upon the fixed members without the rattling or squeaking common to awning-frames of this character.

To these ends my coupling consists of the device shown in the accompanying drawings, in which—

Figure 1 is a side elevation of one of my improved couplings and portions of the awning-frame to which it is attached and with which it is connected as viewed from the left, the coupling being shown in a horizontal position by solid lines and in a vertical position by dotted lines; Fig. 2, the same as viewed from the right, the coupling being shown in a vertical position by solid lines and in a horizontal position by dotted lines; Fig. 3, a longitudinal section of my coupling, taken on the line 3 3; Fig. 4, a vertical longitudinal section, and Fig. 5 a vertical cross-section taken on the line 5 5.

Similar letters refer to similar parts throughout the several views, A being the fixed members of the awning-frame, B the movable members thereof, and C my improved coupling.

The fixed members A are affixed to the building on each side of the doors or windows to be protected by awnings, being secured in place in any suitable manner. As herein shown, they are furnished with flanges $a$, which flanges are in turn secured in place upon the building by means of the bolts or screws $b$. This, however, is not an essential feature, as other means of attachment might serve a like purpose.

The couplings C, affixed to the movable member B and connected with the fixed member A, consist of the yokes $c$, the unions $d$, and the rollers $e$. The yokes $c$ are fashioned substantially as shown—that is, in the form of a letter U as viewed from the upper or lower sides and in the form of a letter J when viewed from the side. They are laterally pierced to receive the clamping-bolts $f$, which secure them to the unions $d$. The unions $d$ consist of short cylindrical portions adapted to connect the yokes $c$ and the movable portions B of the awning-frame. The rear portions of these unions are flattened upon their sides, thus adapting them to fit into the bifurcated portions of the yokes $c$, which flattened portions (like the yokes $c$) are laterally pierced to receive the before-mentioned clamp-bolts $f$, which secure the respective two parts together. These unions are longitudinally pierced and interiorly threaded at their forward ends to receive the exteriorly-threaded portions of the movable portions B of the awning-frame and are provided at their rear ends with the recesses $g$, adapted to receive the roller $e$, which roller is pivotally affixed and revoluble therein.

It will be seen that the opening $h\ m$ (the yoke $c$ lying in the rear of the union $d$) is of such form that the coupling C may be adjusted to either a horizontal or a vertical position and yet be movable upon the fixed members A of the awning-frame. It will further be seen that the movable portions B of the awning-frame may be removed from the building without disturbing the fixed portions A (the vertical members) by either unscrewing the movable portions B from the union $d$ or by removing the clamp-bolt $f$ from the coupling, and thus releasing the union $d$ from the yoke c. It will still further be seen that in whatever position my couplings may be the friction-rollers will impinge and ride upon the fixed members of the awning-frame, thus removing the friction, and thereby eliminating the disagreeable noise common to awning-frames.

What I claim as new, and desire to secure by Letters Patent, is—

The combination with the stationary and movable portions of an awning-frame, of a coupling, embodying a yoke adapted to embrace the said stationary portion; a union affixed to the said movable portion and adapted to attachment to or detachment from the said yoke, and a roller pivotally affixed in the said union, all substantially as shown and for the purposes specified.

AI D. CAMPBELL.

Witnesses:
F. G. O'BRIEN,
S. M. DICKEY.